June 9, 1925.

H. P. MACDONALD

FLEXIBLE JOINT

Filed Dec. 16, 1919      2 Sheets-Sheet 1

WITNESS:
Gustav Genzlinger.

INVENTOR
Harry P. Macdonald
BY
ATTORNEY

June 9, 1925.
H. P. MACDONALD
FLEXIBLE JOINT
Filed Dec. 16, 1919
1,541,520
2 Sheets-Sheet 2
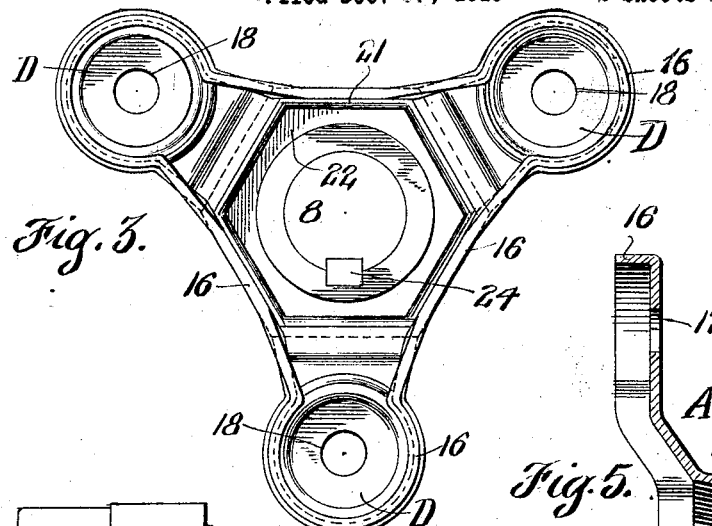
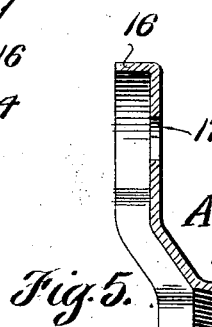
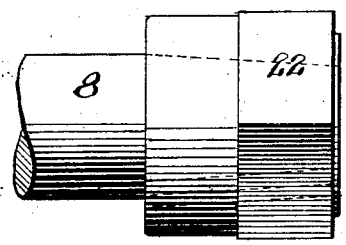
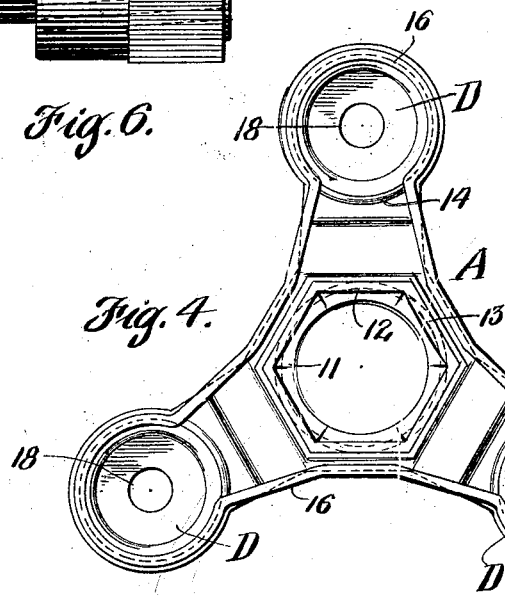
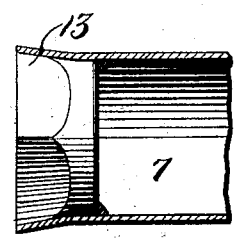
WITNESS:
Gustav Genzlinger.
INVENTOR
Harry P. Macdonald
BY
ATTORNEY Patented June 9, 1925.

1,541,520

UNITED STATES PATENT OFFICE.

HARRY P. MACDONALD, OF MONTCLAIR, NEW JERSEY, ASSIGNOR TO THE SNEAD & COMPANY IRON WORKS, A CORPORATION OF NEW JERSEY.

FLEXIBLE JOINT.

Application filed December 16, 1919. Serial No. 345,292.

*To all whom it may concern:*

Be it known that I, HARRY P. MACDONALD, a citizen of the United States, residing at Montclair, in the county of Essex and State of New Jersey, have invented certain new and useful Improvements in Flexible Joints, of which the following is a specification.

This invention relates to torque transmitting joints for shafting and the like, such as are employed for example in automotive drive assemblies. Ordinarily, such joints comprise in part spiders or equivalent members at the ends of the shafting to be coupled in association with a flexible element or elements secured to the respective spiders, and the invention has to do more particularly with the construction of such spider members.

The spider members customarily employed are drop forgings which are expensive, not only because the special dies required soon wear out and become rough, requiring extra work in the shops to make a product of the proper quality and finish, but also because the process of making such forgings is a wasteful one. In addition, the forgings are apt to be inaccurate and therefore out of balance. The weight is also excessive.

One of the primary objects of my invention is to overcome the aforementioned difficulties and to provide an improved construction which is very simple to manufacture and combines extreme lightness with maximum strength.

Another object of the invention is the provision of an improved form of spider, the parts of which may be stamped out from sheet metal, and in the provision of improved means whereby spiders of this character may be used in conjunction with a flexible disc or discs to form the flexible joint.

Figure 1:
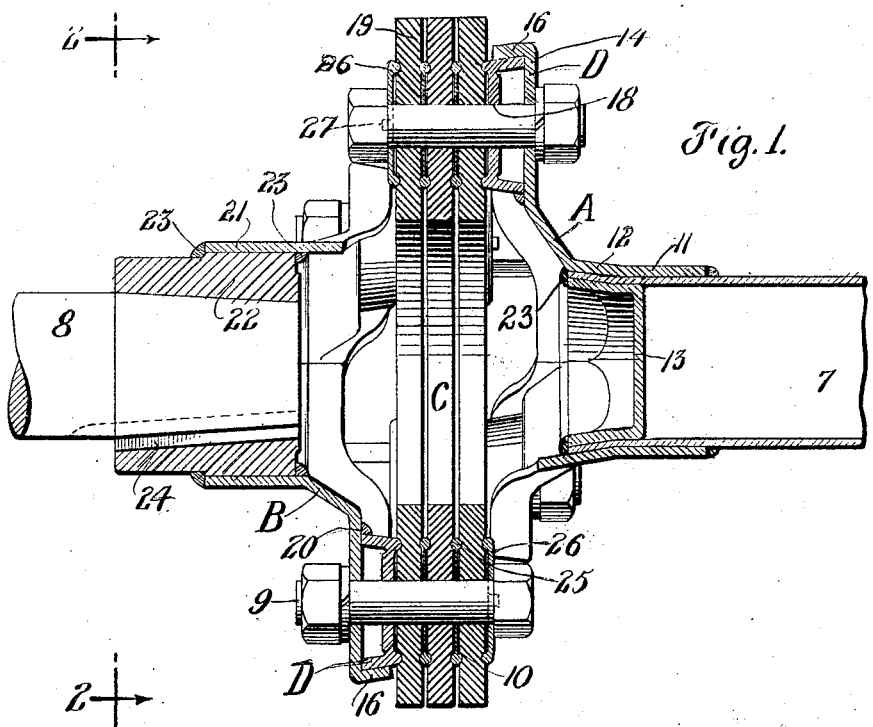
Figure 2:
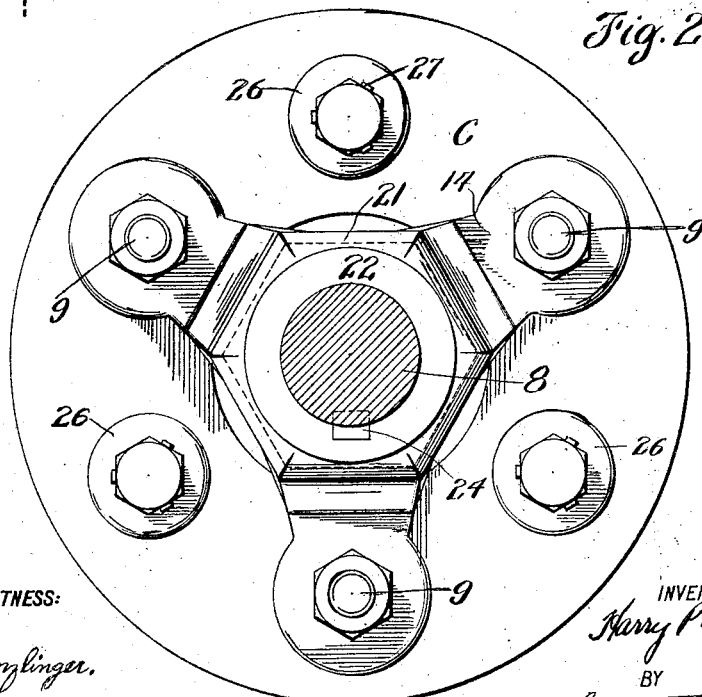

The foregoing, together with such other objects as may hereinafter appear, I obtain by means of a construction which I have illustrated in preferred form in the accompanying drawings, wherein Figure 1 is a longitudinal section through a flexible joint embodying my improvement; Figure 2 is a section taken on the line 2—2 of Figure 1; Figure 3 is a side elevation of one of the spider members looking at a face thereof; Figure 4 is a side elevation of the other spider member, looking at the corresponding face thereof; Figure 5 is a section through a foot of one of the spider members illustrating an intermediate step in the manufacture thereof; Figure 6 is a side elevation of a detail of my invention; and Figure 7 is a section taken through a portion of a tubular shafting illustrating still another detail of my invention.

I have illustrated my invention as applied to a joint suitable for use in an automobile drive assembly, and referring to Figure 1, the floating member of the drive, which in this instance is shown as a tubular shaft 7, is shown at the right, and the rear axle drive shaft 8 at the left. The joint flexibly connecting the shafts comprises the two spiders A and B, respectively secured to the shafts 7 and 8, as will be described; the flexible discs C, of which there are preferably more than one; the sets of holding bolts 9; and the spacing washers or rings 10.

Referring now to the spider A, this member consists of a sheet metal stamping having a central hub, the end 11 of which is cylindrical in cross section to fit the tubular shaft 7, such cylindrical portion merging into another portion 12 which is non-cylindrical in cross section. The portion 12 as shown in the drawing is given a hexagonal shape, and the end of the shaft 7 is spread into such hexagonal portion and a similarly shaped cupped stamping or wedge member 13 is inserted. The purpose of this arrangement is to securely fasten the tube 7 in place as against pulling out and also as against relative rotation. If desired, the parts may be welded or otherwise secured in addition.

The outer portions of the spider are preferably formed into three spider feet 14, the ends of the spider feet being preferably substantially circular. They may have a marginal or peripheral flange 16 extending partially thereabout so that the ends are somewhat of a cupped section to provide a convenient seat for a bolt support as will appear. Those portions of the feet connecting the ends with the hub of the spider are stiffened or reinforced by pressing them into an irregular shape or section as for example into a channel section. The flange at the ends of the spider feet and the stiffening flange of the other portions of the feet may be continuous quite around each foot,—and, indeed, all the way around the spider, as shown. This shape, I have discovered, may readily be stamped and it will be understood that it imparts great rigidity and strength to the spider. The cupped end portion of each spider foot is provided with a central aperture or bolt hole 17. The flange 16, in the first instance, is formed at right angles to the face of the spider. (See Figure 5.)

To afford a means for carrying the bolts 9 which serve to secure the disc C to the respective spiders, and to give such bolts sufficient lateral support, I provide a button-like member D, preferably a cupped stamping, for each spider foot. It will be noted that this stamping flares outwardly from the base, that is to say, its laterally projecting wall or lip is inclined outwardly. the stamping D fits snugly within the cupped spider foot and when it is positioned therein, the flange 16 is crimped in around the stamping D as indicated in Figure 4. When thus crimped in the stampings D are securely held in position. The stampings are provided with bolt holes 18 adapted to aline with bolt holes 17, and since the bolts fit such openings snugly, it will be seen that ample provision is made for extended lateral support of the bolts.

The stampings D are also provided with a raised bead or rim 19 adapted to secure a firm grip on the discs at points well removed from the bolts whereby the loads are distributed over an extended area, while at the same time there is no tendency to force or crowd out the rubber or other yielding material used in the discs from beneath the stampings. The stampings D are welded at points, for example, where the ends of the feet merge into the stiffened portions of the spider although welding may not be required when the ends of the feet are cupped and crimped in. The welding is diagrammatically indicated at 20 in Figure 1.

The spider B is of the same construction and is provided with the same arrangement of cupped stampings D, as the spider A, with the exception that the hub portion 21, instead of being sloping as is the case with the hub of the spider A, is hexagonal with the sides in substantial parallelism and no cylindrical portion is provided. A plug 22 is forced into the hexagonal hub 21 and is secured by welding as indicated at 23. The plug 22 is bored and provided with a key seat 24 and the key seated end of the shaft 8 is fitted into the bore of the plug.

The spacing washers 10 are constructed with an annular bead or rim 25 functioning in the same manner as the bead 19 of the stamping D. The outer washers 26 are substantially similar in construction and are provided with struck up lugs 27 adapted to secure the heads of the bolts as against rotation.

The advantages noted, together with others incident to my invention, will be readily understood by those skilled in the art.

I claim:

1. A spider member for torque transmitting joints for shafting comprising a sheet metal stamping having a hub portion adapted to receive the end of a shaft and provided with feet or securing members, the feet being cupped.

2. A spider member for torque transmitting joints for shafting comprising a sheet metal stamping having a hub portion adapted to receive the end of a shaft and provided with feet or securing members, the ends of the feet being cupped, and the remaining portions being channelled.

3. A spider member for torque transmitting joints for shafting comprising a sheet metal stamping having a central hub portion and spider feet merging therewith, the foot portions of the spider having a continuous flange about the periphery thereof.

4. A spider member for torque transmitting joints for shafting comprising a sheet metal stamping having a central hub portion adapted to receive the end of a shaft and a laterally extending foot or securing portion merging with the hub portion and reinforcing means formed on the foot portion of the spider.

5. A spider member for torque transmitting joints for shafting comprising a sheet metal stamping having a central hub portion adapted to receive a shaft and foot or connecting portions merging therewith, together with a reinforcement.

6. A spider member for torque transmitting joints for shafting comprising a sheet metal stamping having a central hub portion adapted to receive a shaft and foot portions merging therewith, together with a reinforcement connecting the foot portion.

7. A member for torque transmitting joints for shafting comprising a sheet metal stamping with a central hub portion adapted to receive a shaft, laterally extending foot or securing members, and a continuous marginal reinforcing flange extending all the way around the spider.

8. A spider member for torque transmitting joints for shafting comprising in combination a shaft and a sheet metal stamping having a central hub portion adapted to receive such shaft and having a foot portion, said latter portion being cup-shaped, and a button-like member for said foot.

9. A spider member for torque transmitting joints for shafting comprising in combination a sheet metal stamping having a central hub portion adapted to receive a shaft and having a connecting or foot portion, said latter portion being cup-shaped, and a button-like member for said foot together with means for securing the button to the foot.

10. A spider member for torque transmitting joints for shafting comprising a sheet metal stamping having a hub portion adapted to receive a shaft and a foot portion, said latter portion being cup-shaped and a button-like member for said foot portion held in position by crimping in the cupped foot portion.

11. A spider member for torque transmitting joints for shafting comprising a sheet metal stamping having a hub portion adapted to receive a shaft and a cupped foot portion, a frustro-conical button for said foot portion, said button-like member being adapted to be held in position by crimping the foot portion.

12. A member for flexible torque transmitting joints for shafting comprising a sheet metal stamping having a hub portion adapted to receive a shaft and cupped laterally extending connecting portions, said portions having means to receive connecting members of the joints.

13. A member for flexible torque transmitting joints for shafting comprising a sheet metal stamping having a hub portion adapted to receive a shaft and a foot portion extending laterally with reference to the hub adapted to form a connecting medium, said portion being reinforced.

14. A member for flexible torque transmitting joints for shafting comprising a sheet metal stamping having a hub portion adapted to receive a shaft and a portion extending laterally with reference to the hub adapted to form a connecting medium, said portion being stiffened.

15. A member for flexible torque transmitting joints for shafting comprising a sheet metal stamping having a hub portion adapted to receive a shaft and a portion extending laterally with reference to the hub adapted to form a connecting medium, said portion being stiffened by bending the same into an irregular section.

In testimony whereof I have hereunto signed my name.

HARRY P. MACDONALD.